Patented Feb. 24, 1953

2,629,732

UNITED STATES PATENT OFFICE 2,629,732

AMMONIA-METHYL BORATE COMPOUND

William H. Schechter, Zelienople, Pa., assignor, by mesne assignments, to Callery Chemical Company, Pittsburgh, Pa., a corporation of Pennsylvania No Drawing. Application May 10, 1951, Serial No. 225,669

9 Claims. (Cl. 260—462)

This invention relates to compounds containing boron and nitrogen, and more particularly to a novel compound containing boron and nitrogen in the ratio 1:1.

An object of the invention is to provide novel compounds responding to the formula $$NH_3 \cdot B(OR)_3$$

in which R is an alkyl radical, preferably a lower alkyl radical.

A specific object is to provide a compound corresponding to the formula $NH_3 \cdot B(OCH_3)_3$, and which I believe to be an addition compound of ammonia and methyl borate.

A further object is to provide a method of making compounds containing boron and nitrogen in a 1:1 ratio, and particularly the compound of the foregoing object, that is simple, is easily practiced, and in its preferred embodiment results in high yields of compound of high purity.

I have discovered that by treating trimethyl borate, which may be taken as exemplifying the alkyl borates useful in the invention, with ammonia reaction occurs with production of well defined crystals of a compound that satisfies the formula $NH_3 \cdot B(OCH_3)_3$. For example, pure methyl borate $[B(OCH_3)_3]$ may be saturated with ammonia gas $(NH_3)$ at room temperature and pressure. Analysis of the crystalline compound that separates out has verified its formula to correspond to $NH_3 \cdot B(OCH_3)_3$. The compound does not react with sodium hydride (NaH) at temperatures up to 300° C. but sublimes away from the hydride without reaction. The compound has been sublimed through a combustion tube at 375° C. without decomposition. It sublimes at one atmosphere pressure at about 45° C., and the vapor pressure equation:

$$\log_{10} P_{mm.} = -3019.0/T + 12.365$$

is believed to be valid over the temperature range 0° to 50° C.

The compound may be prepared likewise by saturating a mixture of methyl borate and methanol $(CH_3OH)$ with ammonia gas. Thus, the azeotropic mixture containing 48 per cent by weight of $B(OCH_3)_3$ was saturated with dry ammonia gas at room temperature. The compound that crystallized out was shown by Kjeldahl analysis to contain 5.8 milliequivalents of ammonia per gram, and analysis for boron showed 5.79 milliequivalents per gram, thus showing the compound to contain boron and nitrogen in the ratio 1:1. The equivalent weight of compound prepared in this way was found to be 173, which is too high for the simple addition compound, indicating that the crystalline material obtained by this procedure contained alcohol which, however, can not be removed by subjecting the compound to vacuum or heat. Thus some of the crystalline material was sublimed through a combustion tube at 350° C. with little, if any, change in composition. However, by mixing the crystalline material with an alkali or an alkaline earth metal, an alkali metal or alkaline earth metal hydride, e. g., sodium hydride (NaH), or mixtures of two or more of them, and then heating the mixture the compound $NH_3 \cdot B(OCH_3)_3$ sublimes and may be recovered in substantially pure form.

In the foregoing procedures the precipitated compound may carry impurities with it. For that reason it is preferred at present to prepare the compound by vapor phase reaction. In this embodiment dry gaseous ammonia in excess of the stoichiometric requirement is passed with trimethyl borate vapor carried in a stream of nitrogen through a reaction tube. The effluent from the tube is cooled, for example to 0° C., to freeze out the desired ammonia-methyl borate addition compound while excess ammonia and nitrogen pass out of the system. Addition compound prepared in this manner has been found by analysis to have a purity of about 96 per cent according to the best analytical method at present available although the accuracy of that method is not known so that compound prepared in this way may well be of higher purity. The yield has been found to be about 82 per cent although some of the reaction product may not have been condensed, even at 0° C., because of the high vapor pressure of the compound.

The compound prepared in this way provides a useful intermediate for the preparation of other boron-nitrogen compounds, particularly those containing boron and nitrogen in 1:1 ratio. For instance, the methoxy group may be removed by such reagents as metallic sodium (Na), or by catalytic or thermal decomposition.

From what has been described above it will be seen that the temperature and pressure conditions are not critical; in fact, the reaction occurs between trimethyl borate and liquid $NH_3$, but reaction at normal room temperature and pressure is preferred. The reaction is exothermic.

Instead of simple alkyl borate the invention is applicable also to the use of substituted amine-alkyl borates.

In gas welding, e. g. with acetylene, methyl borate is used to some extent in the gas stream as a flux. The addition compounds of this invention, e. g. $NH_3.B(OCH_3)_3$, may be substituted for that purpose. Or instead of the pure compound there may be used the alcoholates such as that described above and which may be represented by the formula $NH_3.B(OCH_3)_3.(CH_3OH)_x$, which may be made inexpensively from the azeotrope referred to.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. A compound corresponding to the formula $NH_3.B(OR)_3$ in which R is a lower alkyl group.

2. The compound $NH_3.B(OCH_3)_3$.

3. That method of making a compound of ammonia and an alkyl borate of the group consisting of lower alkyl tri-esters of boric acid and amine substitution products thereof comprising the steps of reacting dry gaseous ammonia and said borate, and recovering the reaction product.

4. A method according to claim 3, said ammonia and alkyl borate being reacted, at normal atmospheric pressure and temperature.

5. A method according to claim 3, said reaction being effected in vapor phase.

6. That method of making an addition compound of ammonia and trimethyl borate containing boron and nitrogen in 1:1 ratio comprising the steps of reacting dry gaseous ammonia and trimethyl borate, and recovering the crystalline reaction product.

7. That method of making an addition compound of ammonia and trimethyl borate containing boron and nitrogen in 1:1 ratio comprising the steps of reacting trimethyl borate at normal atmospheric pressure and temperature with an excess of dry gaseous ammonia, and recovering the crystalline reaction product.

8. That method of making an addition compound of ammonia and trimethyl borate containing boron and nitrogen in 1:1 ratio comprising the steps of saturating with dry gaseous ammonia a mixture of trimethyl borate and methyl alcohol and recovering the crystalline reaction product.

9. That method of making an addition compound of ammonia and trimethyl borate containing boron and nitrogen in 1:1 ratio comprising the steps of saturating with dry gaseous ammonia a mixture of trimethyl borate and methyl alcohol, recovering the crystalline reaction product, mixing said product with at least one substance of the group consisting of alkali metals, alkaline earth metals, and their hydrides, and subliming the pure addition compound from the latter mixture.

WILLIAM H. SCHECHTER.

REFERENCES CITED

The following references are of record in the file of this patent:

UNITED STATES PATENTS

| Number | Name | Date |
|---|---|---|
| 2,257,194 | Rosen | Sept. 30, 1941 |
| 2,494,968 | Schlesinger | Jan. 17, 1950 |
| 2,505,180 | Georgiev | Apr. 25, 1950 |